United States Patent
Duan et al.

(10) Patent No.: US 8,332,379 B2
(45) Date of Patent: Dec. 11, 2012

(54) SYSTEM AND METHOD FOR IDENTIFYING CONTENT SENSITIVE AUTHORITIES FROM VERY LARGE SCALE NETWORKS

(75) Inventors: Ning Duan, Beijing (CN); Pei-Yun S. Hsueh, White Plains, NY (US); Yan Liu, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 12/813,608

(22) Filed: Jun. 11, 2010

(65) Prior Publication Data

US 2011/0307468 A1 Dec. 15, 2011

(51) Int. Cl.
*G06F 17/30* (2006.01)

(52) U.S. Cl. ........ 707/706; 707/707; 707/708; 707/709; 707/723; 707/748; 707/749; 707/750; 707/751; 707/753

(58) Field of Classification Search .......... 707/706–709, 707/723, 748–753
See application file for complete search history.

(56) References Cited

U.S. PATENT DOCUMENTS

| | | | | |
|---|---|---|---|---|
| 6,738,678 | B1* | 5/2004 | Bharat et al. | 700/48 |
| 7,424,484 | B2* | 9/2008 | Ma et al. | 1/1 |
| 7,779,001 | B2* | 8/2010 | Zeng et al. | 707/726 |
| 7,979,444 | B2* | 7/2011 | Ma et al. | 707/748 |
| 2003/0149694 | A1* | 8/2003 | Ma et al. | 707/9 |
| 2004/0193698 | A1* | 9/2004 | Lakshminarayana | 709/218 |
| 2005/0171946 | A1* | 8/2005 | Maim | 707/5 |
| 2006/0095430 | A1* | 5/2006 | Zeng et al. | 707/7 |
| 2007/0038608 | A1* | 2/2007 | Chen | 707/3 |
| 2008/0313176 | A1* | 12/2008 | Ma et al. | 707/5 |
| 2009/0307344 | A1* | 12/2009 | Kaplan et al. | 709/224 |
| 2009/0327281 | A1* | 12/2009 | Young et al. | 707/5 |
| 2010/0017394 | A1* | 1/2010 | Terada | 707/5 |
| 2010/0114862 | A1* | 5/2010 | Young et al. | 707/709 |
| 2010/0274815 | A1* | 10/2010 | Vanasco | 707/798 |
| 2011/0029657 | A1* | 2/2011 | Gueta et al. | 709/224 |
| 2011/0252041 | A1* | 10/2011 | Broman | 707/748 |
| 2011/0307468 | A1* | 12/2011 | Duan et al. | 707/709 |

* cited by examiner

*Primary Examiner* — Frantz Coby

(74) *Attorney, Agent, or Firm* — Scully, Scott, Murphy & Presser, P.C.; Daniel P. Morris, Esq.

(57) ABSTRACT

A method and system for identifying nodes with similar content. In one aspect, the method comprises determining a structure of a network of nodes, said structure defined by incoming links and outgoing links between nodes within said network, grouping said nodes within said network into a first set of modules, calculating a first modularity value between each of the modules within the first set, said modularity value indicating a degree of similar content within each module, calculating a topical relevance value for each of the modules, selecting those modules whose topical relevance value exceeds a threshold value and calculating an authority score for the selected modules.

22 Claims, 3 Drawing Sheets

US 8,332,379 B2

SYSTEM AND METHOD FOR IDENTIFYING CONTENT SENSITIVE AUTHORITIES FROM VERY LARGE SCALE NETWORKS

BACKGROUND

The present invention generally relates to ranking web pages, and more particularly, ranking web pages on a very large scale network according to their content.

Web pages or websites are usually page ranked on the basis of the number of incoming URL links, the number of outgoing URL links, and on the authority of these incoming and outgoing URL links. Authority is usually measured by the amount of website traffic or page views for a particular URL. One common page rank scheme ranks web pages on a scale of 1 to 10, with 10 being the highest ranking and 1 being the lowest ranking. Websites such as YAHOO®, GOOGLE® and FACEBOOK® have a 10 ranking because of the large number of incoming and outgoing URL links to these websites, as well as a high authority measure due to the high volume of unique website visitors.

The structure of multiple websites can be depicted graphically as a series of interconnected nodes, with incoming and outgoing links connecting each node. Current page ranking techniques do not take into account the "content" or the subject matter of different website pages. Further, current page ranking techniques only take into account the number of links between pairs of websites, and not the number of links among several websites. This can lead to irrelevant information being returned to a user during a search query. For example, a web page devoted to technology may be returned as a search engine result based on a query related to another topic such as politics. Returning an irrelevant search item could be minimized if the search engine was sensitive to the content of the returned web pages. However, computing a content sensitive page rank across a large scale network with billions of web pages, e.g., the Internet, is computationally intensive in terms of time and processor resources.

Thus, there is a need in the art for a method and system that ranks web pages in a content-sensitive manner across large scale networks such as the Internet.

SUMMARY

A method and system for ranking websites based on their structured elements, i.e., incoming and outgoing links, and on their non-structured elements, i.e., the content of the websites, is provided. In one embodiment, the method comprises determining a structure of the network, said structure defined by incoming links and outgoing links between nodes within said network; grouping said nodes within said network into a first set of modules; calculating a first modularity value between each of the modules within the first set, said modularity value indicating a degree of similar content within each module; calculating a topical relevance value for each of the modules; selecting those modules whose topical relevance value exceeds a threshold value; and calculating an authority score for the selected modules.

In one embodiment, there is provided a system for identifying nodes with similar content, said nodes part of a network of nodes, comprising a processor operable to determine a structure of the network, said structure defined by incoming links and outgoing links between nodes within said network, group said nodes within said network into a first set of modules, calculate a first modularity value between each of the modules within the first set, said modularity value indicating a degree of similar content within each module, calculate a topical relevance value for each of the modules, select those modules whose topical relevance value exceeds a threshold value and calculate an authority score for the selected modules.

A computer readable storage medium that implements the method is also provided.

DETAILED DESCRIPTION

Websites may be graphically depicted as a network of interconnected nodes, with multiple incoming links and outgoing links between each node. The overall structure of such a network diagram can be used to rank the importance of different websites relative to all the other websites in the network. Such a ranking scheme may be implemented in page ranking algorithms implemented by search engine websites. A page rank algorithm, according to equation (1) measures the chance for a random website user to visit a particular node. The algorithm relies on two assumptions: 1) there is a uniform probability of visiting each node; and 2) there is a uniform probability of moving from one node to another node within the network.

$$P'(u) = \alpha \Sigma_{v \in B_u} P(v) P(v \rightarrow u) + (1-\alpha) P(u) \quad (1)$$

where $\alpha$ is a fixed parameter determined by heuristics (e.g., a typical value being 0.1), $P(u)$ denotes the probability of reaching a node without following links, and $P(v \rightarrow u)$ denotes the probability of reaching node v from node u. Since the algorithm assumes all nodes can be reached with uniform probability, $P(u)=1/N$ with N representing the total number of nodes in the network. Also because the algorithm assumes uniform transition probability, $P(v \rightarrow u)=1/Nv$, with Nv referring to the total number of nodes that link to node u.

Such a page ranking scheme does not take into account the content of a particular website when calculating its relevance to another website within the network. Therefore, two closely related and highly relevant websites with respect to each other, may not appear together in a search engine listing because those websites may have a limited number of incoming and outgoing links, or even a very low volume of web traffic. Further, content sensitive searching across large networks, such as the Internet, is computationally expensive in terms of processor usage and time. One aspect of the present invention solves both problems because it allows websites within a large network to be ranked both on their structure and their content, and also, minimizes the amount of processor overhead needed to discover pairs or groups (modules) of related websites. While the present invention is disclosed in terms of web searching, the same techniques may also be extended to desktop searching, document searching and database searching.

Figure 1:
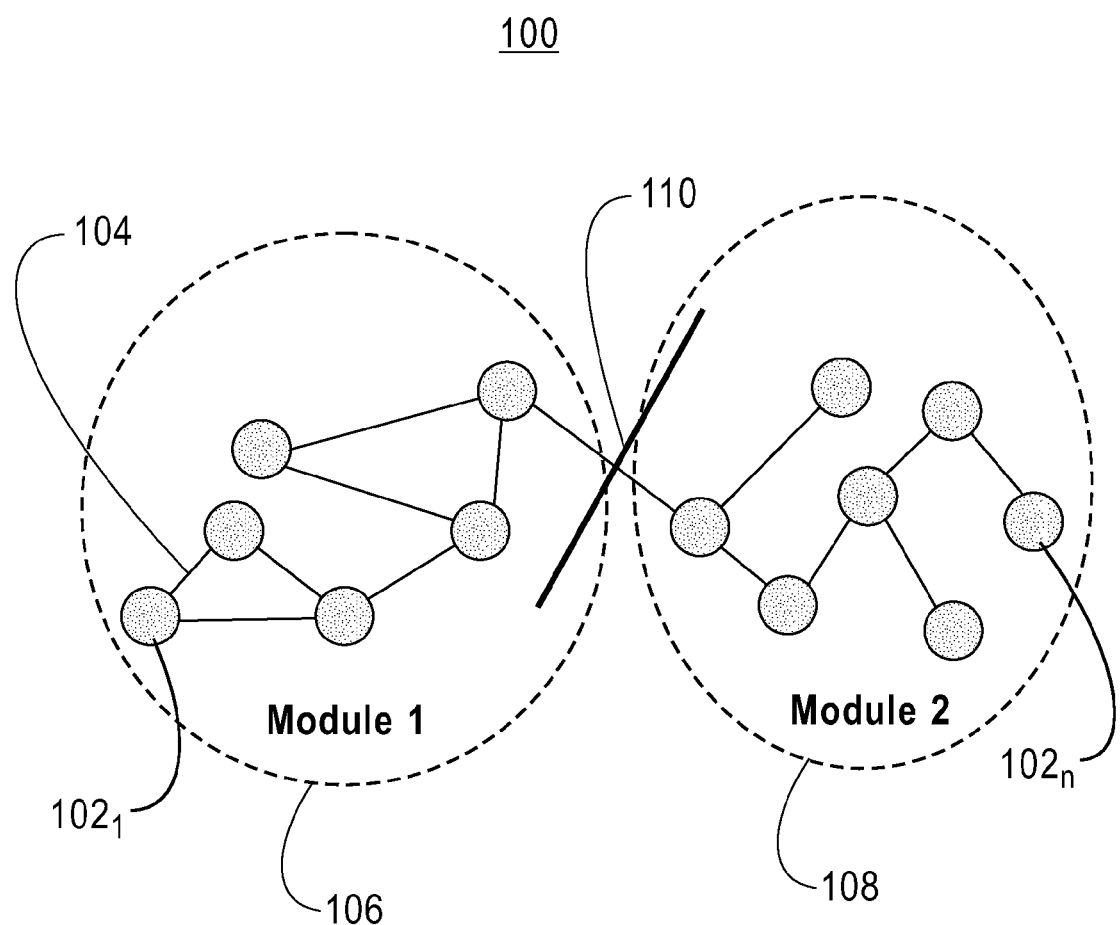
FIG. 1 is an example of several websites depicted as a series of interconnected nodes.

FIG. 1 is an example of a network 100 that comprises several websites depicted as a series of interconnected nodes $102_1$ to $102_n$. Incoming and outgoing links between each of the nodes 102 are represented by lines 104. The nodes 102 are further grouped together into modules, e.g., modules 106 and 108, separated by a partition 110. Links between nodes within a module, e.g., 106, are known as intra module links. Links between two modules, e.g., 106 and 108, are known as intermodule links.

The relatedness of the different websites grouped together into modules can be measured by calculating a modularity value for the entire of the network. In one embodiment, the most effective grouping of nodes into modules, and hence the best modularity value, occurs when the modules are the least lexically similar. In one embodiment, modularity is measured as a numeric value between −1 and 1, and lower values (towards −1) are considered better.

One embodiment of modularity measures the difference between the proportion of intramodule links and the proportion of intermodule links within the network. The modularity of an entire network is the sum of the modularity of its individual modules, i.e., the modularity of network 100 is equal to the sum of the modularity of modules 106 and 108. Modularity can be calculated according to equation (2):

$$M = \sum_{i=1}^{r} \left[ \frac{|L_{ii}|}{|L|} - \left(\frac{D_i}{2|L|}\right)^2 \right] \quad (2)$$

where r denotes the number of modules, |L_{ii}|=total number of intramodule links (from a node in module i to another node in module i) in module i, |L| denotes the number of within-module links (i.e., links between nodes in Module i), and $D_i = \Sigma_j L_{ij}$ denotes the degree of Module i, i.e., the total number of links that connect the nodes in Module i. $D_i$ is the total number of links that connect the nodes in Module i to other nodes, without differentiating whether the other nodes are in the same module or not. |L| consists of only those links to the other nodes that are not in the same module.

If the modularity of a network is zero, then the nodes of this network follow a random partition. When the partition consists of only one module, the modularity is 1; when the partition of a fully connected network of n nodes consists of n modules each with only one node, the modularity is −1/((n−1)^2). The degree of a node in a module is the number of links the node has to other nodes.

The calculation of modularity can be improved by including a measure of lexical similarity between nodes (websites). The inclusion of a measure of lexical similarity between nodes into the modularity calculation provides an indication of the amount of similar content within a module. Lexical similarity may be calculated according equation (3):

$$lexsim(u, v) = \frac{\sum_{w_i \in U \cap V} P_U(w_i) P_V(w_i)}{\sqrt{\left(\sum_{w_i \in U} P_U(w_i)^2\right)\left(\sum_{w_i \in V} P_V(w_i)^2\right)}} \quad (3)$$

where U and V are the word vectors of Node (U) and Node (V), $w_i$ represents word i; $P_U(w_i)$ represents the probability of word i occurring in the word vector U.

A word vector is a word or a character string that forms part of a word. A word vector may also include one or more wildcard characters. Commonly used wildcard characters may include "*" and "%" and indicate that a character string may be part of a longer word. For example, the word technology may be associated with the word vectors "tech" "tech*" and "technology". The word vectors for a particular node are generally the most common found words, word roots, or character strings within the node.

In one embodiment, lexical similarity between two or more nodes can be measured by comparing the word vectors associated with one node against the word vectors of another node to establish a measure of content similarity between the nodes. As an example, Node "U", a webpage about computer systems, contains the word vectors "technology" "computers" "processors" "memory" "storage" and "network". Node "V", a webpage about politics, contains the word vectors "politics" "politician" "election" and "voter". A comparison between the occurrence of word vectors associated with node "U" and the word vectors associated with node "V" indicates that node "V" is lexically dissimilar to node "U".

Modularity can also be improved including a measure of lexical similarity between nodes (websites) and a particular topic of interest. The inclusion of a measure of lexical similarity between nodes and a topic of interest into the modularity calculation provides an indication of the amount of similar content between the nodes and the topic. Topical similarity may be calculated according equation (4):

$$topsim(u, q) = \frac{\sum_{w_i \in U \cap Q} P_U(w_i) P_Q(w_i)}{\sqrt{\left(\sum_{w_i \in U} P_U(w_i)^2\right)\left(\sum_{w_i \in Q} P_Q(w_i)^2\right)}} \quad (4)$$

where U and Q are the word vectors of Node (U) and the topic of interest (Q), $w_i$ represents word i; PU (wi) represents the probability of word i occurring in the topic of interest.

In one embodiment, topical similarity between nodes and a topic of interest can be measured by comparing the word vectors associated with the topic of interest against the word vectors of a particular node to establish content similarity between the node and the topic of interest. For example, the topic of interest "Q" may be associated with the word vectors "technology" "computers" "processors" "memory" "storage" and "network". As an example, Node "U", a webpage about computer systems, also contain the word vectors "technology" "computers" "processors" "memory" "storage" and "network"; node "V" a webpage about politics, contains the word vectors "politics" "politician" "election" and "voter". A comparison between the occurrence of word vectors associated with the topic of interest "Q" and the word vectors associated with node "U" indicates that node "U" is lexically similar to topic "Q". A comparison between the occurrence of word vectors associated with the topic of interest "Q" and the word vectors associated with node "V" indicates that node "V" is lexically dissimilar to "Q".

Some networks are constructed as hierarchical trees. Semantic similarity between nodes within a network structured as a hierarchical tree can be measured by the distance traveled from one node to another in the hierarchical tree structure according to equation (5):

$$semsim(u, v) = 1 - \frac{2\text{depth}(LCS(u, v))}{\text{depth}(u) + \text{depth}(v)} \quad (5)$$

where LCS (u,v) denotes the lowest common subsumer of Node u and v and depth denotes the number of links in the tree.

The calculated lexical similarity value of equation (3) can be normalized across all the backward inlinks to a particular node by their sum into a probability metric such that the resulting normalized similarity scores can be substituted for P (v→u) into the pagerank score of equation (1). The topical similarity value of equation (4) can be normalized across all the nodes in the network and substituted for P(u) into the pagerank score of equation (1). A content sensitive version of the pagerank algorithm can be written according to equation (6):

$$P'(u) = \alpha \frac{\sum_{v \in B_u} P(v) lexsim(u, v)}{\sum_{v \in B_u} lexsim(u, v)} + (1-\alpha) \frac{topsim(u, q)}{\sum_{u \in Nodes} topsim(u, q)} \quad (6)$$

Figure 2:
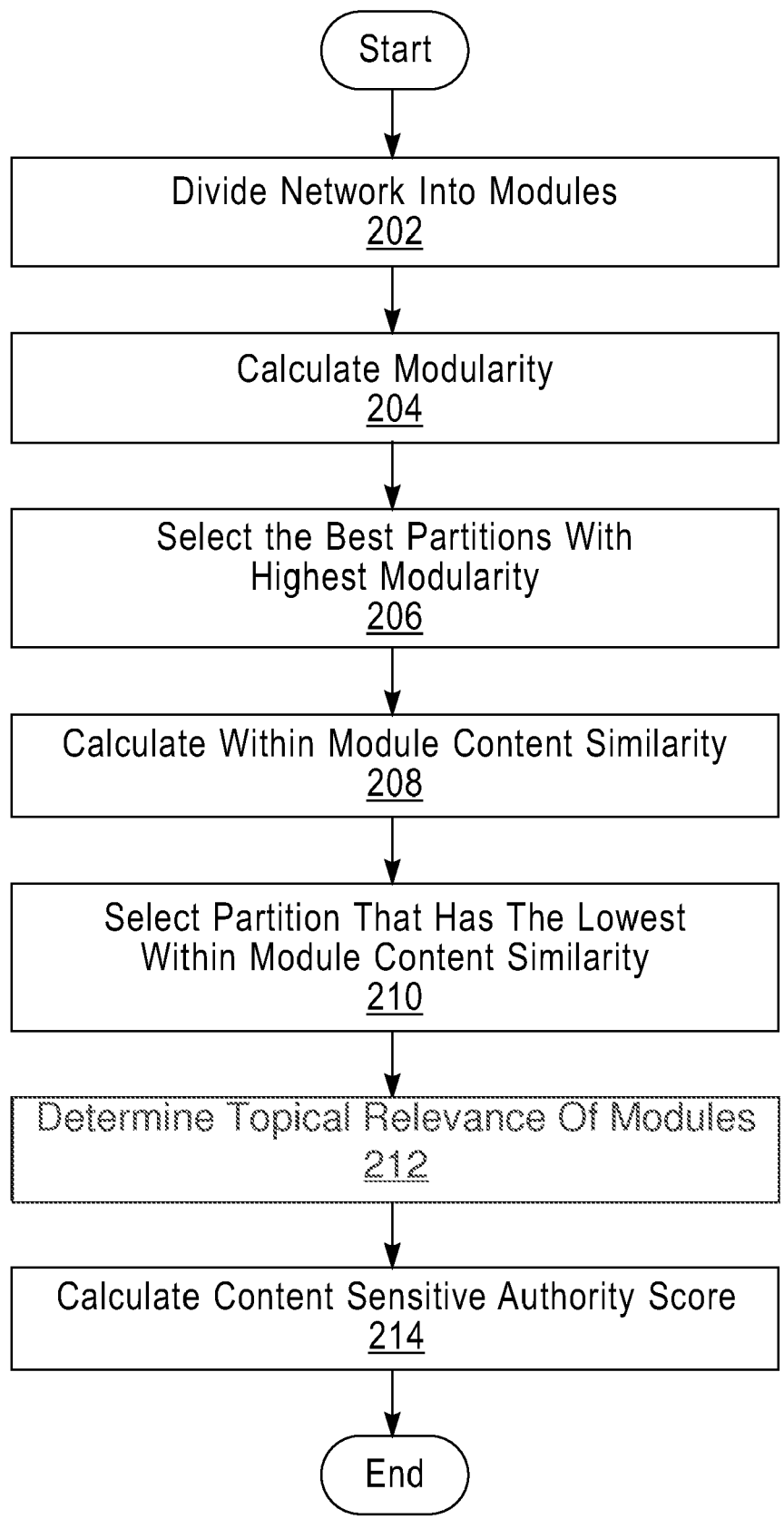
FIG. 2 is a flow diagram of a method for implementing the present invention.

Lexical similarity equation (3) can be incorporated into modularity equation (2), resulting in an improved modularity equation (7):

$$M' = \sum_{i=1}^{r} [e_{ii} - (a_{ij})^2] \quad (7)$$

where $e_{ii} = \sum_{1:u \to v \in L_{ij}} lexsim(u, v)$ and $a_{ij} = \sum_{1:u \to v \in L_{ij}} lexsim(u, v)$ FIG. 2 is one embodiment of a method for identifying content sensitive authorities from a network, e.g., the network 100 shown in FIG. 1. The method utilizes the above equations to compute an authority (pagerank) score that takes into account the similarity of the content of different websites within the network. The method begins at step 202 when a system divides the nodes within the network into several modules. In one embodiment, the system identifies all possible combinations of nodes grouped together into modules and places a partition between each module. Partitions separate the modules into discrete groups of nodes and are placed across the intermodule links. In an example of the most extreme grouping of nodes into modules, each module may include only one node.

At step 204, a modularity value for each of the modules within the network is calculated. In one embodiment, the modularity value is calculated according to equation 2. In another embodiment, the modularity value is calculated according to equation 7. The modularity value, in one aspect, is a measure of similarity of content between modules and also intramodule similarity. In one embodiment, modules with dissimilar content to a chosen topic have lower modularity scores, while modules with similar content to a chosen topic have higher modularity scores. At step 206, the 'N' best partitions with the highest modularity score are chosen. 'N' is any number chosen by the user, e.g., the 3 best partitions, 5 best partitions, etc.

At step 208, intramodule similarity between nodes is calculated. In one embodiment, the intramodule similarity is calculated according to equation 3, which determines the lexical similarity between nodes. In embodiments in which the network has a hierarchical tree structure, intramodule similarity may also be calculated according to equation 5, which determines the semantical similarity between nodes.

At step 210, the partition that results in the lowest intermodule similarity is selected from among the 'N' best partitions. The similarity of modules is computed based on the lexical or semantic distance between the word vectors of the two nodes on the ends of the intermodule links. The further the lexical or semantic distance between the two nodes on the intermodule links, the further the distance between the two modules separated by the partition and less the similarity (lexically or semantically) between the two modules.

At step 212, a determination of topical relevance of the modules is calculated. In one embodiment, the topical relevance of different modules may be calculated according equation 4. As discussed above, topical relevance can be determined by a comparison of word vectors. Nodes that are considered more relevant to the topic will have more word vectors in common with predefined word vectors associated with the topic than a less relevant node.

At step 214, a content sensitive page rank authority score is calculated according to equation 6. The authority score incorporates equations 3 and 4, and takes into consideration content similarity between nodes, as well as similarity between a node and a topic. The content sensitive page rank authority score is used to rank the nodes (webpages) based on their relevance to a given topic.

Figure 3:
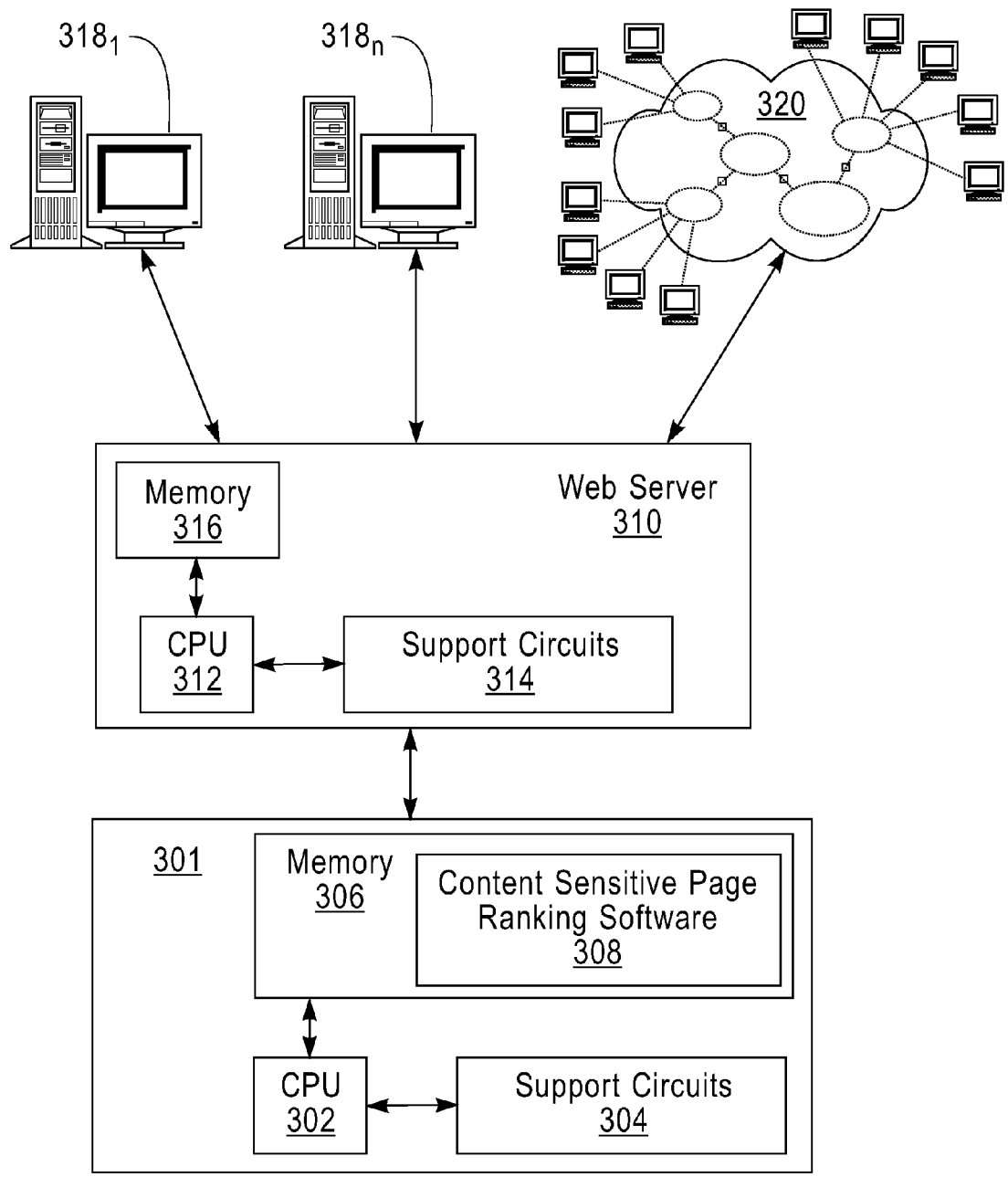
FIG. 3 is an overview of a computing environment in which the present invention can be implemented.

FIG. 3 is a computing environment which can benefit from the present invention. A client computer 301 is connected to a web server 310, and the web server is connected to one or more computers 318 and network cloud 320. In one embodiment, the computing environment is a large scale network of multiple computers 318 interconnected to each other and connected to the client computer 301 via web server 310. Each computer 318 hosts one or more websites and these websites are interconnected by links to other websites (as shown in FIG. 1) within the computing environment.

The client computer 301 comprises a processor (CPU) 302, support circuits 304 and a memory 306. The processor 302 is interconnected to the support circuits 304 and the memory 306. The processor 302 runs instructions and programs stored in the memory 306, such as "content sensitive ranking software" 308. The support circuits 304 include input/output (I/O) circuits, clocks, power supply circuits and network interface circuits. The support circuits 304 facilitate communication between the client computer 301 and the web server 310.

The memory 306 may include random access memory, read only memory, removable disk memory, flash memory, and various combinations of these types of memory. The memory 306 is sometimes referred to as a main memory and may in part be used as cache memory.

The web server 310 comprises a processor (CPU) 312, support circuits 314 and a memory 316. The function of the web server 310 is to provide web pages to the client computer 301. The web server 310 is connected to the client computer 301 via a network, such as the Internet or Ethernet. The web server 310 accepts HyperText Transport Protocol (HTTP) or other web page requests from the client computer 301 and provides the web page or another appropriate response to the client computer. The web server 310 may also be a group of web servers. For simplicity, only one client computer 301 and one web server 310 are depicted.

The web server 310 is coupled to many computers $318_1$ to $318_n$ and to network cloud 320, which also comprises additional computers. Each of these computers 318 function as website hosts, and store the websites and web pages provided from the web server 310 to the client computer 301. Each of these individual websites may function as a node, and these nodes can be grouped into modules as discussed above. A content sensitive authority score can be calculated for each node in comparison to a topic or another website utilizing the method described above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a 'circuit,' 'module' or 'system.' Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction operation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction operation system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the 'C' programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIGS. 1 through 3. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be operated substantially concurrently, or the blocks may sometimes be operated in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A method for identifying nodes with similar content, said nodes part of a network of nodes, comprising:
    determining a structure of the network, said structure defined by incoming links and outgoing links between nodes within said network;
    grouping said nodes within said network into a first set of modules;
    calculating a first modularity value for each of the modules within the first set, said modularity value indicating a degree of lexical similarity between said nodes within each module;
    grouping said nodes within said network into a second set of modules, said second set of modules different from the first set of modules;

calculating a second modularity value between each of the modules within the second set, said second modularity value indicating a degree of similar content within each module;

comparing said second modularity value to said first modularity value;

selecting the set of modules associated with the lower modularity value;

calculating a topical relevance value for each of the modules in the selected set;

selecting those modules whose topical relevance value exceeds said threshold value; and calculating an authority score for the selected modules in the selected set.

2. The method of claim 1, further comprising:

calculating an authority score for the selected modules based on said topical relevance and said degree of lexical similarity within each module.

3. The method of claim 2, wherein said network is hierarchical tree network and said topical relevance is calculated according to:

$$semsim(u, v) = 1 - \frac{2 \; depth(LCS(u, v))}{depth(u) + depth(v)}.$$

4. The method of claim 1, wherein the first modularity value and the second modularity value is calculated according to:

$$M = \sum_{i=1}^{r}\left[\frac{|L_{ii}|}{L} - \left(\frac{D_i}{2|L|}\right)^2\right]$$

where M=modularity, r=number of modules, |L|=total number of links in the network, |L_{i}i|=total number of intramodule links in module i and $D_i$=total number of links that connect the nodes in module i.

5. The method of claim 1, wherein each node is associated with one or more word vectors, said one or more word vectors representing content of said node, and said topical relevance between a pair of nodes is measured as a function of lexical distance between said one or more word vectors associated with said pair of nodes.

6. The method of claim 5, wherein said lexical distance is calculated according to:

$$topsim(u, q) = \frac{\sum_{w_i \in U \cap Q} P_U(w_i) P_Q(w_i)}{\sqrt{\left(\sum_{w_i \in U} P_U(w_i)^2\right)\left(\sum_{w_i \in Q} P_Q(w_i)^2\right)}}.$$

7. The method of claim 5, wherein said lexical distance is calculated according to:

$$lexsim(u, v) = \frac{\sum_{w_i \in U \cap V} P_U(w_i) P_V(w_i)}{\sqrt{\left(\sum_{w_i \in U} P_U(w_i)^2\right)\left(\sum_{w_i \in V} P_V(w_i)^2\right)}}.$$

8. The method of claim 1, wherein said authority score is calculated according to:

$$P'(u) = \alpha \frac{\sum_{V \in B_u} P(v) lexsim(u, v)}{\sum_{v \in B_u} lexsim(u, v)} + (1 - \alpha) \frac{topsim(u, q)}{\sum_{u \in Nodes} topsim(u, q)}.$$

9. A computer program product for identifying nodes with similar content, said nodes part of a network of nodes, comprising:

a storage medium readable by a processor and storing instructions for operation by the processor for performing a method comprising:

determining a structure of the network, said structure defined by incoming links and outgoing links between nodes within said network;

grouping said nodes within said network into a first set of modules;

calculating a first modularity value between each of the modules within the first set, said modularity value indicating a degree of similar content within each module;

grouping said nodes within said network into a second set of modules, said second set of modules different from the first set of modules;

calculating a second modularity value between each of the modules within the second set, said second modularity value indicating a degree of similar content within each module;

comparing said second modularity value to said first modularity value;

selecting the set of modules associated with the lower modularity value;

calculating a topical relevance value for each of the modules in the selected set;

selecting those modules whose topical relevance value exceeds a threshold value; and calculating an authority score for the selected modules in the selected set.

10. The computer program product of claim 9, wherein the first modularity value and the second modularity value is calculated according to:

$$M = \sum_{i=1}^{r}\left[\frac{|L_{ii}|}{|L|} - \left(\frac{D_i}{2|L|}\right)^2\right]$$

where M=modularity, r=number of modules, |L|=total number of links in the network, |L_{i}i|=total number of intramodule links in module i and $D_i$=total number of links that connect the nodes in module i.

11. The computer program product of claim 9, wherein each node is associated with one or more word vectors, said one or more word vectors representing content of said node, and said topical relevance between a pair of nodes is measured as a function of lexical distance between said one or more word vectors associated with said pair of nodes.

12. The computer program product of claim 11, wherein said lexical distance is calculated according to:

$$topsim(u, q) = \frac{\sum_{w_i \in U \cap Q} P_U(w_i) P_Q(w_i)}{\sqrt{\left(\sum_{w_i \in U} P_U(w_i)^2\right)\left(\sum_{w_i \in Q} P_Q(w_i)^2\right)}}.$$

13. The computer program product of claim 11, wherein said lexical distance is calculated according to:

$$lexsim(u, v) = \frac{\sum_{w_i \in U \cap V} P_U(w_i) P_V(w_i)}{\sqrt{\left(\sum_{w_i \in U} P_U(w_i)^2\right)\left(\sum_{w_i \in V} P_V(w_i)^2\right)}}.$$

14. The computer program product of claim 9, wherein said network is a hierarchical tree network and said topical relevance is calculated according to:

$$semsim(u, v) = 1 - \frac{2 \; depth(LCS(u, v))}{depth(u) + depth(v)}.$$

15. The computer program product of claim 9, wherein said authority score is calculated according to:

$$P'(u) = \alpha \frac{\sum_{v \in B_u} P(v) lexsim(u, v)}{\sum_{v \in B_u} lexsim(u, v)} + (1 - \alpha) \frac{topsim(u, q)}{\sum_{u \in Nodes} topsim(u, q)}.$$

16. A system for identifying nodes with similar content, said nodes part of a network of nodes, comprising a processor operable to:
  determine a structure of the network, said structure defined by incoming links and outgoing links between nodes within said network,
  group said nodes within said network into a first set of modules,
  calculate a first modularity value between each of the modules within the first set, said modularity value indicating a degree of similar content within each module,
  group said nodes within said network into a second set of modules, said second set of modules different from the first set of modules;
  calculate a second modularity value between each of the modules within the second set, said second modularity value indicating a degree of similar content within each module;
  compare said second modularity value to said first modularity value;
  select the set of modules associated with the lower modularity value;
  calculate a topical relevance value for each of the modules in the selected set,
  select those modules whose topical relevance value exceeds a threshold value and
  calculate an authority score for the selected modules in the selected set.

17. The system of claim 16, wherein the processor calculates the first modularity value and the second modularity value according to:

$$M = \sum_{i=1}^{r} \left[ \frac{|L_{ii}|}{|L|} - \left(\frac{D_i}{2|L|}\right)^2 \right]$$

where M=modularity, r=number of modules, |L|=total number of links in the network, $|L_{ii}|$=total number of intramodule links in module i and $D_i$=total number of links that connect the nodes in module i.

18. The system of claim 16, wherein each node is associated with one or more word vectors, said one or more word vectors representing content of said node, and said topical relevance between a pair of nodes is measured as a function of lexical distance between said one or more word vectors associated with said pair of nodes.

19. The system of claim 18, wherein said lexical distance is calculated according to:

$$topsim(u, q) = \frac{\sum_{w_i \in U \cap Q} P_U(w_i) P_Q(w_i)}{\sqrt{\left(\sum_{w_i \in U} P_U(w_i)^2\right)\left(\sum_{w_i \in Q} P_Q(w_i)^2\right)}}.$$

20. The system of claim 18, wherein said lexical distance is calculated according to:

$$lexsim(u, v) = \frac{\sum_{w_i \in U \cap V} P_U(w_i) P_V(w_i)}{\sqrt{\left(\sum_{w_i \in U} P_U(w_i)^2\right)\left(\sum_{w_i \in V} P_V(w_i)^2\right)}}.$$

21. The system of claim 18, wherein said network is a hierarchical tree network and said lexical distance is calculated according to:

$$semsim(u, v) = 1 - \frac{2 \; depth(LCS(u, v))}{depth(u) + depth(v)}.$$

22. The system of claim 16, wherein said authority score is calculated according to:

$$P'(u) = \alpha \frac{\sum_{v \in B_u} P(v) lexsim(u, v)}{\sum_{v \in B_u} lexsim(u, v)} + (1 - \alpha) \frac{topsim(u, q)}{\sum_{u \in Nodes} topsim(u, q)}.$$

* * * * *